US012575583B2

(12) United States Patent
Okuda

(10) Patent No.: US 12,575,583 B2
(45) Date of Patent: Mar. 17, 2026

(54) METHOD FOR PRODUCING STRETCHING CHEESE SUBSTITUTE

(71) Applicants: AMANO ENZYME U.S.A. CO., LTD., Elgin, IL (US); AMANO ENZYME INC., Nagoya (JP)

(72) Inventor: Keita Okuda, Kakamigahara (JP)

(73) Assignees: Amano Enzyme U.S.A. Co., Ltd., Elgin, IL (US); Amano Enzyme Inc., Nagoya (JP)

( * ) Notice: Subject to any disclaimer, the term of this patent is extended or adjusted under 35 U.S.C. 154(b) by 191 days.

(21) Appl. No.: 18/547,980

(22) PCT Filed: Feb. 25, 2022

(86) PCT No.: PCT/JP2022/008083
§ 371 (c)(1),
(2) Date: Aug. 25, 2023

(87) PCT Pub. No.: WO2022/181810
PCT Pub. Date: Sep. 1, 2022

(65) Prior Publication Data
US 2024/0138431 A1 May 2, 2024

(30) Foreign Application Priority Data

Feb. 26, 2021 (JP) .................................. 2021-030292
Dec. 3, 2021 (JP) .................................. 2021-197380

(51) Int. Cl.
| A23C 20/02 | (2025.01) |
| A23J 3/14 | (2006.01) |
| A23J 3/34 | (2006.01) |

(52) U.S. Cl.
CPC .............. *A23C 20/025* (2013.01); *A23J 3/14* (2013.01); *A23J 3/346* (2013.01)

(58) Field of Classification Search
CPC ........... A23C 20/025; A23J 3/14; A23J 3/346
USPC ........................................................ 426/656
See application file for complete search history.

(56) References Cited

U.S. PATENT DOCUMENTS

| RE28,810 E | 5/1976 | Tsumura et al. |
| 4,499,116 A | 2/1985 | Zwiercan et al. |
| 6,086,926 A | 7/2000 | Bruce et al. |
| 6,455,081 B1 | 9/2002 | Han et al. |
| 2008/0213428 A1 | 9/2008 | Sato et al. |
| 2010/0166912 A1 | 7/2010 | Furumai et al. |
| 2015/0305361 A1* | 10/2015 | Holz-Schietinger .... A23L 25/00 |
| | | 426/62 |
| 2019/0037872 A1 | 2/2019 | Bergsma |
| 2019/0059408 A1 | 2/2019 | Bouron et al. |
| 2024/0122197 A1* | 4/2024 | Okuda ................. A23C 20/025 |

FOREIGN PATENT DOCUMENTS

| JP | S47-020381 B1 | 6/1972 |
| JP | S49-000471 A | 1/1974 |
| JP | S50-1556618 A | 12/1975 |
| JP | S59-205940 A | 11/1984 |
| JP | 2000-333600 A | 12/2000 |
| JP | 2002-199842 A | 7/2002 |
| JP | 2003-250481 A1 | 9/2003 |
| JP | 2016-502868 A | 2/2016 |
| JP | 2018-516078 A | 6/2018 |
| WO | WO 2006/135089 A1 | 12/2006 |
| WO | WO 2009/001443 A1 | 12/2008 |

OTHER PUBLICATIONS

Extended Search Report for European Application No. 22759844.8, dated Nov. 26, 2024, (in 11 pages).
International Search Report received in International Application No. PCT/JP2022/008082, mailed May 17, 2022.
Japanese Office Action for App. No.2023-502566, dated Jan. 27, 2026 (in 3 pages).

* cited by examiner

*Primary Examiner* — Brent T O'Hern
(74) *Attorney, Agent, or Firm* — Knobbe, Martens, Olson & Bear, LLP

(57) ABSTRACT

The purpose of the present invention is to provide a technique for producing a cheese substitute by which improved stretchability can be imparted to a cheese substitute which contains a plant protein and 0.6 part by weight or more, per part by weight of the plant protein, of starch. A method for producing a stretching cheese substitute, said method comprising a step for treating a starting material composition, which contains a plant protein and 0.6 part by weight or more, per part by weight of the plant protein, of starch, with an enzyme preparation containing a protease optionally together with an amylase, wherein the enzyme preparation is used so as to give a starch gelatinization ability of the amylase of 8 U or less per gram of the starch, relative to 100,000 U of the protease activity of the protease per gram of the plant protein. The cheese substitute obtained by this method has improved stretchability.

13 Claims, No Drawings

METHOD FOR PRODUCING STRETCHING CHEESE SUBSTITUTE

TECHNICAL FIELD

The present invention relates to a method for producing a stretchable cheese alternative. More specifically, the present invention relates to a method for producing a stretchable cheese alternative that has heat stretchability and is made from a plant protein as a raw material.

BACKGROUND ART

For various reasons such as a recent health boom, countermeasures against allergy problems, and religious reasons, plant protein foods have become popular as alternatives to animal protein foods.

Since a plant protein material is greatly different from an animal protein material, various processing techniques have been studied in the creation of plant protein foods in order to bring flavor, texture, or the like closer to those of animal protein foods.

A cheese-like food using a plant protein as a raw material, or what is called plant cheese, has been studied as a candidate for an alternative to cheese using animal milk as a raw material. For example, Patent Document 1 discloses that a cream cheese-like food produced by oxidizing an emulsion containing a soybean protein hydrolysate obtained by a treatment with a protease in a neutral to alkaline range and an oil is smooth and has a good flavor to the same extent as of cream cheese.

PRIOR ART DOCUMENT

Patent Document

Patent Document 1: International Publication No. 2006/135089

SUMMARY OF THE INVENTION

Problems to be Solved by the Invention

Among the characteristics of cheese using animal milk as a raw material, a particularly distinctive one is a characteristic of extending when heated (this characteristic is hereinafter also referred to as "stretchability"). This characteristic is related to casein contained in animal milk and also contributes to the appetite for cheese. On the other hand, plant cheese (hereinafter also referred to as a "cheese alternative") having a completely different protein composition is inherently not stretchable.

In order to impart stretchability to a cheese alternative, it is conceivable to add starch. The present inventor attempted to impart stretchability to a cheese alternative by adding starch and confirmed that when starch was added in an amount of 0.6 parts by weight or more per 1 part by weight of a plant protein, an excellent stretchability improving effect was obtained. However, since the effect of only adding starch to impart stretchability to a cheese alternative is limited, a technique capable of further enhancing stretchability is desired.

Therefore, an object of the present invention is to provide a technique for producing a cheese alternative capable of imparting improved stretchability to the cheese alternative containing a plant protein and 0.6 parts by weight or more of starch per 1 part by weight of the plant protein.

Means for Solving the Problem

The present inventor has found that the stretchability of the resulting cheese alternative is improved by adding a protease to a material composition having a specific composition containing a plant protein and 0.6 parts by weight or more of starch per 1 part by weight of the plant protein. Furthermore, although an amylase is sometimes combined in the use of a protease, the present inventor has also found that, when an amylase is also added to the material composition together with a protease, the starch dextrinizing activity of the amylase that is acceptable for the material composition is limited to a predetermined condition (that is, the condition satisfying the relationship that the starch dextrinizing activity per 1 g of starch is 8 U or less with respect to a protease activity of 100,000 U per 1 g of the plant protein). Such a limitation was not recognized for a material composition not having the specific composition (that is, a material composition having a composition containing a plant protein and less than 0.6 parts by weight of starch per 1 part by weight of the plant protein) and thus was specific to the material composition having the specific composition. The present invention has been completed by further conducting studies based on these findings.

That is, the present invention provides the invention of the following aspects.

Item 1. A method for producing a stretchable cheese alternative, including a step of treating a material composition containing a plant protein and 0.6 parts by weight or more of starch per 1 part by weight of the plant protein with an enzyme preparation containing a protease and optionally containing an amylase, in which the enzyme preparation is used so that starch dextrinizing activity of the amylase per 1 g of the starch is 8 U or less with respect to a protease activity of 100,000 U of the protease per 1 g of the plant protein.

Item 2. The production method according to item 1, in which the enzyme preparation contains the amylase, and the starch dextrinizing activity per 1 g of the starch is 0.5 U or more with respect to the protease activity of 100,000 U per 1 g of the plant protein.

Item 3. The production method according to item 1 or 2, in which the protease is a bacteria-derived protease.

Item 4. The production method according to any of items 1 to 3, in which the protease is a protease derived from the genus *Bacillus* and/or the genus *Geobacillus*.

Item 5. The production method according to any of items 1 to 4, in which the protease is selected from the group consisting of proteases derived from *Bacillus stearothermophilus, Bacillus licheniformis*, and these species in the genus *Geobacillus*.

Item 6. The production method according to any of items 1 to 5, in which the enzyme preparation is used such that the protease activity per 1 g of the plant protein is 10 to 500 U.

Item 7. The production method according to any of items 1 to 6, further including a step of treating with a peptidase.

Item 8. The production method according to any of items 1 to 7, in which the plant protein is a pea protein, a fava bean protein, a chickpea protein, and/or a lentil protein.

Item 9. The production method according to any of items 1 to 8, in which a content of the plant protein in the material composition is 1 wt % or more and less than 15 wt %.

Item 10. The production method according to any of items 1 to 9, in which the starch is tapioca starch.

Item 11. The production method according to any of items 1 to 10, in which a content of the starch per 1 part by weight of the plant protein is 5 parts by weight or less.

Item 12. A stretchability improver for a stretchable cheese alternative containing a plant protein and 0.6 parts by weight or more of starch per 1 part by weight of the plant protein, containing an enzyme preparation containing a protease and optionally containing an amylase, the stretchability improver used so that starch dextrinizing activity of the amylase per 1 g of the starch is 8 U or less with respect to a protease activity of 100,000 U of the protease per 1 g of the plant protein.

Item 13. The stretchability improver according to item 12, further including a peptidase.

Advantages of the Invention

The present invention provides a technique for producing a cheese alternative capable of imparting improved stretchability to the cheese alternative containing a plant protein and 0.6 parts by weight or more of starch per 1 part by weight of the plant protein.

EMBODIMENT OF THE INVENTION

1. Method for Producing Stretchable Cheese Alternative

A method for producing a stretchable cheese alternative of the present invention includes a step (hereinafter also referred to as a "protease treatment step") of treating a material composition containing a plant protein and 0.6 parts by weight or more of starch per 1 part by weight of the plant protein with an enzyme preparation containing a protease and optionally containing an amylase, and the enzyme preparation is used so that starch dextrinizing activity of the amylase per 1 g of the starch is 8 U or less with respect to a protease activity of 100,000 U of the protease per 1 g of the plant protein. The method for producing a stretchable cheese alternative of the present invention will be described below in detail. The present invention can improve the stretchability of the resulting cheese alternative or, in addition to improving the stretchability, further impart a thermal meltability improving effect and/or a hydrophobic peptide reducing effect (the hydrophobic peptide reducing effect refers to an effect of decomposing a hydrophobic peptide exhibiting a bitter taste to replace it with a hydrophobic amino acid).

1-1. Material Composition Containing Plant Protein and Starch

The plant from which the plant protein is derived is not particularly limited, and examples thereof include beans such as peas, soybeans, fava beans, chickpeas, and lentils; cereals such as barley, wheat, oat, rice, buckwheat, Japanese barnyard millet, and foxtail millet; and nuts such as almonds, cashew nuts, hazelnuts, pecan nuts, macadamia nuts, pistachio nuts, walnuts, Brazil nuts, peanuts, and coconuts. The plant proteins derived from these plants may be used singly, or two or more types having different origins may be used in combination.

Among them, from the viewpoint of further improving the stretchability or from the viewpoint of further imparting the thermal meltability improving effect and/or the hydrophobic peptide reducing effect in addition to this viewpoint, a bean protein is preferable, and a protein from peas, fava beans, chickpeas, or lentils is more preferable.

The content of the plant protein in the material composition is not particularly limited, and examples thereof include 1 to 30 wt %, preferably 1 wt % or more and less than 15 wt %, more preferably 3 to 12 wt %, still more preferably 4 to 11 wt %, still more preferably 4 to 9 wt %, 4 to 8 wt %, 4 to 7 wt %, 4 to 6 wt %, 6 to 11 wt %, 7 to 11 wt %, 8 to 11 wt %, or 9 to 11 wt %.

The plant serving as the origin of the starch is not particularly limited as long as it can impart stretchability to the cheese alternative, and examples thereof include cassava, potato, sweet potato, and kudzu. The starch derived from these plants may be used singly, or two or more types having different origins may be used in combination.

Among them, cassava starch (tapioca starch) is preferable from the viewpoint of further improving the stretchability or from the viewpoint of further imparting the thermal meltability improving effect and/or the hydrophobic peptide reducing effect in addition to this viewpoint.

In the material composition, the content of the starch per 1 part by weight of the plant protein is 0.6 parts by weight or more. Since the production method of the present invention is excellent in the effect of improving stretchability, the stretchability can be effectively improved even under disadvantageous conditions in which the ratio of the starch to the plant protein is more likely to be adversely affected by the starch dextrinizing activity when the enzyme preparation containing an amylase is used. From such a viewpoint, a suitable example of the content of the starch per 1 part by weight of the plant protein is preferably 0.7 parts by weight or more, more preferably 0.8 parts by weight or more, still more preferably 1 part by weight or more, still more preferably 1.5 parts by weight or more, still more preferably 2 parts by weight or more, particularly preferably 2.5 parts by weight or more, per 1 part by weight of the plant protein.

The upper limit of the starch content range per 1 part by weight of the plant protein in the material composition is not particularly limited but is, for example, 5 parts by weight or less from the viewpoint of appropriately blending a predetermined amount of plant protein. In addition, since the production method of the present invention is excellent in the effect of improving the stretchability, the stretchability can be effectively improved even when the content ratio of the starch to the plant protein is relatively small. From such a viewpoint, suitable examples of the upper limit of the starch content range per 1 part by weight of the plant protein include preferably 3 parts by weight or less, more preferably 2 parts by weight or less, still more preferably 1.2 parts by weight or less, still more preferably 0.9 parts by weight or less. Furthermore, the upper limit of the starch content range per 1 part by weight of the plant protein is preferably 3 parts by weight or less, more preferably 2 parts by weight or less, still more preferably 1.2 parts by weight or less, still more preferably 0.9 parts by weight or less, from the viewpoint of reducing adverse effects by the starch dextrinizing activity even when an enzyme preparation containing an amylase is used.

The content of the starch in the material composition is not particularly limited as long as stretchability can be imparted but is, for example, 4 wt % or more. From the viewpoint of further improving the stretchability or from the viewpoint of further imparting the thermal meltability improving effect and/or the hydrophobic peptide reducing effect in addition to this viewpoint, the content of the starch in the material composition is preferably 5 wt % or more, more preferably 6 wt % or more, still more preferably 7 wt % or more, still more preferably 8 wt % or more, 9 wt % or more, 10 wt % or more, 11 wt % or more, 12 wt % or more, or 13 wt % or more.

The upper limit of the starch content range in the material composition is not particularly limited but is, for example, 20 wt % or less from the viewpoint of appropriately blending a predetermined amount of plant protein. In addition, since the production method of the present invention is excellent in the effect of improving the stretchability, the stretchability can be effectively improved even when the content of the starch is relatively small. From such a viewpoint, the upper limit of the starch content range in the material composition is preferably 17 wt % or less, more preferably 15 wt % or less, still more preferably 13 wt % or less, still more preferably 11 wt % or less, still more preferably 9 wt % or less.

The material composition can contain, as a component other than the plant protein and the starch, any material components (hereinafter also referred to as "other material components") used for cheese alternatives. Examples of the other material components include plant fats/oils, thickening polysaccharides, water, and common salt.

The plant fat/oil is not particularly limited, and examples thereof include canola oil (rapeseed oil), coconut oil, corn oil, olive oil, soybean oil, peanut oil, walnut oil, almond oil, sesame oil, cottonseed oil, sunflower seed oil, safflower oil, flaxseed oil, palm oil, palm kernel oil, palm fruit oil, babassu oil, shea butter, mango butter, cocoa butter, wheat germ oil, and rice bran oil. These plant fats/oils may be used singly or in combination of two or more. Canola oil (rapeseed oil) and coconut oil are preferable from the viewpoint of further improving the stretchability or from the viewpoint of further imparting the thermal meltability improving effect and/or the hydrophobic peptide reducing effect in addition to this viewpoint.

When the material composition contains a plant fat/oil, the content of the plant fat/oil in the material composition is not particularly limited but is, for example, 5 to 30 wt %, preferably 8 to 25 wt %, more preferably 10 to 20 wt %, still more preferably 10 to 17 wt %, 12 to 17 wt %, 12 to 14 wt %, or 14 to 17 wt %, from the viewpoint of further improving the stretchability or from the viewpoint of further imparting the thermal meltability improving effect and/or the hydrophobic peptide reducing effect in addition to this viewpoint. The content ratio between the plant protein and the plant fat/oil is determined by the content of each of the above components, and the content of the plant oil per 1 part by weight of the plant protein is, for example, 0.3 to 5 parts by weight, preferably 0.5 to 4.5 parts by weight, more preferably 0.7 to 4 parts by weight or 0.7 to 3.5 parts by weight, still more preferably 0.9 to 3.5 parts by weight, still more preferably 1.1 to 3.3 parts by weight, 1.1 to 3.2 parts by weight, or 1.2 to 3 parts by weight.

The thickening polysaccharide is not particularly limited, and examples thereof include locust bean gum, guar gum, carrageenan, xanthan gum, tragacanth gum, tamarind seed gum, pectin, gum arabic, curdlan, tara gum, gellan gum, gum ghatti, carboxymethyl cellulose (CMC), sodium alginate, and pullulan, preferably carrageenan and the like. These thickening polysaccharides may be used singly or in combination of two or more. Carrageenan is preferable from the viewpoint of further improving the stretchability or from the viewpoint of further imparting the thermal meltability improving effect and/or the hydrophobic peptide reducing effect in addition to this viewpoint.

When the material composition contains a thickening polysaccharide, the content of the thickening polysaccharide in the material composition is not particularly limited but is, for example, 0.3 to 1.8 wt %, preferably 0.8 to 1.2 wt %, from the viewpoint of further improving the stretchability or from the viewpoint of further imparting the thermal meltability improving effect and/or the hydrophobic peptide reducing effect in addition to this viewpoint. The content ratio between the plant protein and the thickening polysaccharide is determined by the content of each of the components described above, and the content of the thickening polysaccharide per 1 part by weight of the plant protein is, for example, 0.03 to 0.3 parts by weight, preferably 0.08 to 0.12 parts by weight.

When the material composition contains water, the content of water is not particularly limited but is, for example, 50 to 72 wt %, preferably 55 to 70 wt %, more preferably 62 to 68 wt %, from the viewpoint of further improving the stretchability or from the viewpoint of further imparting the thermal meltability improving effect and/or the hydrophobic peptide reducing effect in addition to this viewpoint. The content ratio between the plant protein and water is determined by the content of each of the components described above, and the content of water per 1 part by weight of the plant protein is, for example, 1 to 17 parts by weight, preferably 3 to 15 parts by weight, more preferably 6 to 13 parts by weight, 6 to 9 parts by weight, or 9 to 13 parts by weight.

When the material composition contains common salt, the content of common salt is not particularly limited but is, for example, 0.1 to 1 wt %, more preferably 0.3 to 0.5 wt %, from the viewpoint of further improving the stretchability or from the viewpoint of further imparting the thermal meltability improving effect and/or the hydrophobic peptide reducing effect in addition to this viewpoint. The content ratio between the plant protein and common salt is determined by the content of each of the above components, and the content of common salt per 1 part by weight of the plant protein is, for example, 0.008 to 0.15 parts by weight, preferably 0.01 to 0.12 parts by weight, 0.02 to 0.12 parts by weight, 0.02 to 0.1 parts by weight, or 0.02 to 0.09 parts by weight, more preferably 0.03 to 0.09 parts by weight, 0.03 to 0.06 parts by weight, or 0.06 to 0.09 parts by weight.

1-2. Enzyme Preparation

The enzyme preparation used for treating the material composition contains at least a protease and may contain an amylase. When the enzyme preparation contains an amylase, the amylase is not limited to one that is further added to a protease preparation, and one that is blended with the protease preparation or one in another arbitrary form is used together with a protease.

In the present invention, the protease refers to an endopeptidase. The origin of the protease is not particularly limited, and examples thereof include proteases derived from bacteria of the genus *Bacillus*, the genus *Geobacillus*, and the like; proteases derived from fungi of the genus *Aspergillus*, the genus *Mucor*, the genus *Neurospora*, the genus *Penicillium*, the genus *Rhizomucor*, the genus *Rhizopus*, and the genus *Sclerotinia*; proteases derived from yeast of the genus *Saccharomyces*; and proteases derived from actinomycetes of the genus *Streptomyces*. These proteases may be used singly or in combination of two or more kinds thereof.

Among these proteases, from the viewpoint of further enhancing the stretchability or from the viewpoint of further imparting the thermal meltability improving effect and/or the hydrophobic peptide reducing effect in addition to this viewpoint, proteases derived from bacteria are preferable, proteases derived from the genus *Bacillus* and/or *Geobacil-*

*lus* are more preferable, proteases derived from *Bacillus stearothermophilus, Bacillus licheniformis*, and these species in the genus *Geobacillus* are still more preferable, *Bacillus stearothermophilus* and *Geobacillus stearothermophilus* are still more preferable, and *Geobacillus stearothermophilus* is particularly preferable.

The enzyme preparation can be used so that the protease activity of the protease per 1 g of the plant protein will be, for example, 10 to 500 U. From the viewpoint of further enhancing the stretchability or from the viewpoint of further imparting the thermal meltability improving effect and/or the hydrophobic peptide reducing effect in addition to this viewpoint, the enzyme preparation can be used so that the protease activity of the protease per 1 g of the plant protein will be preferably 30 to 500 U, more preferably 50 to 500 U, still more preferably 80 to 500 U. Since the production method of the present invention is excellent in the stretchability improving effect, the stretchability improving effect can be effectively provided even with a relatively small amount of protease. From such a viewpoint, the enzyme preparation may be used so that the protease activity of the protease per 1 g of the plant protein will be, for example, 10 to 400 U, 10 to 300 U, 10 to 200 U, 10 to 150 U, or 10 to 100 U.

In the present invention, the amylase means an α-amylase. The origin of the amylase is not particularly limited, and examples thereof include bacteria of the genus *Bacillus* (such as *Bacillus amyloliquefaciens, Bacillus subtilis*, and *Bacillus licheniformis*), the genus *Geobacillus*, and the like; fungi of the genus *Aspergillus* (such as *Aspergillus oryzae* and *Aspergillus niger*), the genus *Mucor*, the genus *Neurospora*, the genus *Penicillium*, the genus *Rhizomucor*, the genus *Rhizopus*, the genus *Sclerotinia*, and the like; and actinomycetes of the genus *Streptomyces*. These amylases may be used singly or in combination of two or more kinds thereof.

The enzyme preparation is used so that the starch dextrinizing activity of the amylase per 1 g of the starch will be 8 U or less with respect to a protease activity of 100,000 U of the protease per 1 g of the plant protein. From the viewpoint of further enhancing the stretchability or from the viewpoint of further imparting the thermal meltability improving effect and/or the hydrophobic peptide reducing effect in addition to this viewpoint, the starch dextrinizing activity per 1 g of the starch with respect to a protease activity of 100,000 U per 1 g of the plant protein is preferably 7 U or less, more preferably 6.5 U or less, still more preferably 5.5 U or less, still more preferably 4.5 U or less, still more preferably 3.5 U or less or 2 U or less.

The lower limit value of the range of the starch dextrinizing activity per 1 g of the starch with respect to a protease activity of 100,000 U per 1 g of the plant protein is 0 U or more. For example, when the enzyme preparation contains no amylase, the starch dextrinizing activity per 1 g of the starch with respect to a protease activity of 100,000 U per 1 g of the plant protein is 0 U. When the enzyme preparation contains the amylase, the starch dextrinizing activity per 1 g of the starch with respect to a protease activity of 100,000 U per 1 g of the plant protein is more than 0 U, preferably 0.5 U or more, more preferably 1 U or more, still more preferably 1.5 U or more, 2 U or more, or 3 U or more.

The protease activity is measured by the Folin method using casein as a substrate, and specifically, the protease activity is such an enzyme activity that, when an enzyme reaction is performed using casein as a substrate by a usual method, the amount of enzyme that causes an increase in the amount of Folin reagent reactive substances corresponding to 1 μg of tyrosine per minute is 1 unit (1 U). The starch dextrinizing activity is such an enzyme activity that the amount of the enzyme at which the coloration of potato starch caused by iodine is reduced by 10% per minute is defined as 1 unit (1 U).

From the viewpoint of further improving the stretchability or from the viewpoint of further imparting the thermal meltability improving effect and/or the hydrophobic peptide reducing effect in addition to this viewpoint, the present invention preferably further includes a step of treating with a peptidase (hereinafter also referred to as a "peptidase treatment step") in addition to the protease treatment step.

The peptidase treatment step may be performed simultaneously with the protease treatment step or may be performed after the protease treatment step. That is, the material composition containing the plant protein and the starch may be subjected to a treatment in which both the protease and the peptidase act simultaneously, or the material composition containing the plant protein and the starch may be subjected to a treatment in which the protease acts and then a treatment in which the peptidase acts.

In the present invention, the peptidase refers to an exopeptidase. The origin of the peptidase is not particularly limited, and examples thereof include peptidases derived from fungi of the genus *Rhizopus*, the genus *Aspergillus*, and the like; peptidases derived from actinomycetes of the genus *Streptomyces*; and peptidases derived from bacteria of the genus *Bacillus*, the genus *Geobacillus*, the genus *Lactobacillus*, the genus *Lactococcus*, and the like. More specifically, peptidases derived from fungi of the genus *Rhizopus*, the genus *Aspergillus*, and the like can be used. Still more specifically, peptidases derived from *Rhizopus oryzae* and *Aspergillus oryzae* can be used. These peptidases may be used singly or in combination of two or more kinds thereof.

Among these peptidases, peptidases derived from *Rhizopus* are preferred, and peptidases derived from *Rhizopus oryzae* are more preferred, from the viewpoint of further enhancing the stretchability or from the viewpoint of further imparting the thermal meltability improving effect and/or the hydrophobic peptide reducing effect in addition to this viewpoint.

The peptidase can be used so that the peptidase activity per 1 g of the plant protein will be, for example, 0.001 to 1 U. From the viewpoint of further enhancing the stretchability or from the viewpoint of further imparting the thermal meltability improving effect and/or the hydrophobic peptide reducing effect in addition to this viewpoint, the peptidase can be used so that the peptidase activity per 1 g of the plant protein will be, for example, 0.002 to 0.8 U, preferably 0.0025 to 0.7 U, more preferably 0.003 to 0.6 U, still more preferably 0.0035 to 0.4 U, still more preferably 0.0035 to 0.3 U, still more preferably 0.004 to 0.25 U, 0.004 to 0.02 U, 0.004 to 0.01 U, 0.004 to 0.008 U, 0.004 to 0.006 U, 0.01 to 0.25 U, 0.02 to 0.25 U, 0.03 to 0.25 U, 0.04 to 0.25 U, 0.05 to 0.25 U, 0.1 to 0.25 U, or 0.2 to 0.25 U.

The peptidase activity is measured by a method based on the ninth edition of Japan's Specifications and Standards for Food Additives using L-leucyl-glycyl-glycine as a substrate. Specifically, the peptidase activity is such an enzyme activity that, when an enzyme reaction is performed using L-leucyl-glycyl-glycine as a substrate by a usual method, the amount of enzyme that causes an increase in the amount of ninhydrin reactive substances corresponding to 1 μmol of leucine per minute is 1 unit (1 U).

1-3. Treatment Conditions Etc.

The specific procedures in the protease treatment step and the peptidase treatment step performed as necessary are not particularly limited as long as the enzyme treatment target and the enzyme are brought into contact with each other. For example, in the protease treatment step, the protease (or the protease and the amylase) may be added after the material composition is prepared, or constituent materials of the material composition and the protease (or the protease and the amylase) may be simultaneously mixed. In addition, as the combination of the protease treatment step and the peptidase treatment step, the protease (or the protease and the amylase) and the peptidase may be added simultaneously or sequentially after the material composition is prepared, or constituent materials of the material composition, the protease (or the protease and the amylase), and the peptidase may be mixed simultaneously.

The temperatures in the protease treatment step and the peptidase treatment step performed as necessary are not particularly limited but can be appropriately determined by those skilled in the art according to the optimal temperature of each enzyme to be used and the like, and examples thereof include 45 to 90° C. In the present invention, the treatment temperature can be changed stepwise. For example, a heating condition 1 of 45° C. or higher and lower than 70° C., preferably 45 to 60° C., more preferably 45 to 55° C., can be combined with a heating condition 2 of 70 to 90° C., preferably 80 to 90° C. Preferably, in these treatment steps, after the treatment under the heating condition 1 is performed, the treatment under the heating condition 2 can be performed.

The time required for these treatment steps is not particularly limited but may be appropriately determined according to the preparation scale of the enzyme treatment target or the like, and the time is, for example, 10 minutes or more, preferably 15 minutes or more. The upper limit of the range of the enzyme treatment reaction time is not particularly limited but is, for example, 6 hours or less, 3 hours or less, 1 hour or less, or 30 minutes or less. Preferably, in these treatment steps, after the treatment under the heating condition 1 is performed for 10 to 30 minutes, the treatment under the heating condition 2 can be performed for 5 to 10 minutes.

After completion of the required treatment steps, the treated material composition can be filled into a container as necessary and cooled. The stretchable cheese alternative is thus obtained.

2. Stretchability Improver for Cheese Alternative

As described above, in the production of the stretchable cheese alternative containing the plant protein and 0.6 parts by weight or more of the starch per 1 part by weight of the plant protein, the stretchability can be improved by using the enzyme preparation containing the protease and optionally containing the amylase so that the starch dextrinizing activity per 1 g of the starch will be 8 U or less with respect to a protease activity of 100,000 U per 1 g of the plant protein. Therefore, the present invention also provides a stretchability improver for the stretchable cheese alternative containing the plant protein and 0.6 parts by weight or more of the starch per 1 part by weight of the plant protein, the stretchability improver containing the enzyme preparation containing the protease and optionally containing the amylase, the stretchability improver used so that starch dextrinizing activity of the amylase per 1 g of the starch will be 8 U or less with respect to a protease activity of 100,000 U of the protease per 1 g of the plant protein. From the viewpoint of further improving the stretchability, the stretchability improver for the stretchable cheese alternative preferably further contains a peptidase.

For the above stretchability improver, the kinds of components to be used, the amounts thereof to be used, and the like are as described in the section of "1. Method for Producing Stretchable Cheese Alternative" above.

EXAMPLES

The present invention will be specifically described below with reference to examples, but the present invention is not to be construed as being limited to the following examples.
[Enzyme Used]
Commercially available enzymes shown in the following table were used.

TABLE 1

| Type | Trade name | Origin | Manufacturer |
|---|---|---|---|
| Protease preparation | Thermoase GL30 | Geobacillus stearothermophilus | Amano Enzyme Inc. |
| Protease preparation | Protin SD-AY10 | Bacillus licheniformis | Amano Enzyme Inc. |
| α-Amylase preparation | Kleistase E5CC | Bacillus amyloliquefaciens | Amano Enzyme Inc. |
| Protease preparation | Thermoase PC10FNA | Geobacillus stearothermophilus | Amano Enzyme Inc. |
| Peptidase preparation | Peptidase R | Rhizopus oryzae | Amano Enzyme Inc. |

[Method for Measuring Enzyme Activity]
(1) Method for Measuring Protease Activity After 5 mL of a 0.6% (w/v) casein solution (0.05 mol/L sodium hydrogen phosphate, pH 8.0) was heated at 37° C. for 10 minutes, 1 mL of a sample solution containing the protease was then added, and the mixture was immediately shaken. This solution was allowed to stand at 37° C. for 10 minutes, and then 5 mL of a trichloroacetic acid reagent solution containing 1.8% of trichloroacetic acid, 1.8% of sodium acetate, and 0.33 mol/L of acetic acid was added thereto. The mixture was shaken, allowed to stand again at 37° C. for 30 minutes, and filtered. The first 3 mL of the filtrate was removed, and the next 2 mL of the filtrate was measured out. Then, 5 mL of a 0.55-mol/L sodium carbonate reagent solution and 1 mL of a Folin reagent solution (1→3) were added, and the mixture was shaken well and left at 37° C. for 30 minutes. For this solution (enzyme reaction solution), an absorbance AT at a wavelength of 660 nm was measured using water as a control.

Separately, an absorbance AB was measured for a solution (blank) obtained by the same operation as for the above-described enzyme reaction solution except that 1 mL of a sample solution containing the protease was weighed, 5 mL of a trichloroacetic acid reagent solution containing 1.8% of trichloroacetic acid, 1.8% of sodium acetate, and 0.33 mol/L of acetic acid was added, the mixture was shaken, 5 mL of a 0.6% (w/v) casein solution was added, and the mixture was immediately shaken and left at 37° C. for 30 minutes.

The amount of enzyme that caused an increase in the amount of Folin reagent reactive substances corresponding to 1 μg of tyrosine per minute was defined as 1 unit (1 U).

To each of 1 mL, 2 mL, 3 mL, and 4 mL of a 1-mg/mL tyrosine standard stock solution (0.2 mol/L hydrochloric acid) weighed, a 0.2-mol/L hydrochloric acid reagent solution was added until the total amount became 100 mL. Each of the solutions was measured out in an amount of 2 mL, 5 mL of a 0.55-mol/L sodium carbonate reagent solution and 1 mL of a Folin reagent solution (1→3) were added, and the mixture was immediately shaken and left at 37° C. for 30 minutes. For these solutions, absorbances A1, A2, A3, and A4 at a wavelength of 660 nm were measured using, as a control, a solution obtained by weighing 2 mL of a 0.2-mol/L hydrochloric acid reagent solution and subjecting the solution to the same operation as described above. The absorbances A1, A2, A3, and A4 were plotted on the vertical axis, and the amount of tyrosine (µg) in 2 mL of each solution was plotted on the horizontal axis. A calibration curve was prepared to determine the amount of tyrosine (µg) per absorbance difference of 1.

$$\text{Protease activity (U/g,U/mL)}=(AT\!-\!AB)\times F\times 11/2\times 1/10\times 1/M$$

[Math. 1]

AT: Absorbance of enzyme reaction solution

AB: Absorbance of blank

F: Amount of tyrosine (µg) when difference in absorbance determined from tyrosine calibration curve is 1

11/2: Conversion factor into total solution amount after termination of reaction 1/10: Conversion factor into value per reaction time of 1 minute M: Amount of sample (g or mL) in 1 mL of sample solution (2) Method for Measuring Starch Dextrinizing Activity After 10 mL of a 1% potato starch substrate solution (0.1 mol/L acetic acid (pH 5.0)) was heated at 37° C. for 10 minutes, 1 mL of a sample solution containing an amylase was then added, and the mixture was immediately shaken. This solution was left standing at 37° C. for 10 minutes, then 1 mL of this solution was added to 10 mL of a 0.1-mol/L hydrochloric acid reagent solution, and the mixture was immediately shaken. Next, 0.5 mL of this solution was weighed, and 10 mL of a 0.0002-mol/L iodine reagent solution (Japanese Pharmacopoeia) was added thereto. The mixture was shaken, and then the absorbance (AT) at a wavelength of 660 nm was measured using water as a control. Separately, 1 mL of water was added instead of the sample solution, the same operation was carried out, and the absorbance (AB) was measured. The amount of the enzyme at which the coloration of potato starch caused by iodine was reduced by 10% per minute was defined as 1 unit (1 U).

$$\text{Starch dextrinizing activity (U/g)}=(AB\!-\!AT)/AB\times 1/W$$

[Math. 2]

AT: Absorbance of reaction solution

AB: Absorbance of blank solution

W: Amount of sample (g) in 1 mL of sample solution (3) Method for Measuring Peptidase Activity As a sample solution, a solution obtained by weighing an appropriate amount of the enzyme and adding water and a potassium phosphate buffer solution (0.005 mol/L) having a pH of 7.0 or a potassium phosphate buffer solution (0.005 mol/L, pH 7.0, containing zinc sulfate) thereto to dissolve or uniformly disperse the enzyme and adjust the amount to 50 mL was used, or a solution obtained by diluting the resulting solution 10 times, 100 times, or 1,000 times with water or the same buffer solution was used.

To 30 mg of L-leucyl-glycyl-glycine weighed, a potassium phosphate buffer solution (0.05 mol/L) having a pH of 7.0 was added to dissolve L-leucyl-glycyl-glycine and adjust the amount to 50 mL. This solution was diluted 10 times with a potassium phosphate buffer solution (0.05 mol/L) having a pH of 7.0 to obtain a substrate solution. This substrate solution was prepared before use.

In a stoppered test tube, 1 mL of the substrate solution was weighed and heated at 37° C. for 5 minutes, then 0.1 mL of the sample solution was added and mixed, and the mixture was heated at 37° C. for 60 minutes, then heated in a boiling water bath for 5 minutes, and cooled to room temperature. To this solution, 2 mL of a ninhydrin-2-methoxyethanol-citric acid buffer reagent solution and 0.1 mL of a tin (II) chloride reagent solution were added, the stopper was put, and the mixture was heated in a boiling water bath for 20 minutes. After cooling, 10 mL of 1-propanol (1→2) was added, and the mixture was shaken to obtain a test solution. Separately, 0.1 mL of the sample solution was weighed in a stoppered test tube and heated in a boiling water bath for 5 minutes. After cooling, 1 mL of the substrate solution was added and mixed, and the mixture was heated at 37° C. for 5 minutes and then cooled to room temperature. To this solution, 2 mL of a ninhydrin-2-methoxyethanol-citric acid buffer reagent solution and 0.1 mL of a tin (II) chloride reagent solution were added, the stopper was put, and the mixture was heated in a boiling water bath for 20 minutes. After cooling, 10 mL of 1-propanol (1→2) was added, and the mixture was shaken to obtain a comparative solution. For the test solution and the comparative solution, when the absorbances at a wavelength of 570 nm are measured within 5 to 30 minutes after preparation, the absorbance of the test solution is larger than the absorbance of the comparative solution. When there was turbidity in the test solution and the comparative solution for measuring the absorbance, centrifugation was performed, and the supernatant was measured. The amount of enzyme that caused an increase in the amount of ninhydrin reactive substances corresponding to 1 µmol of leucine per minute was defined as 1 unit (1 U).

$$\text{Peptidase activity (U/g,U/mL)}=(AT\!-\!AB)\times F\times (1/0.1)\times (1/60)\times n$$

[Math. 3]

AT: Absorbance of enzyme reaction solution

AB: Absorbance of blank

F: Amount of leucine (µmol) when difference in absorbance determined from calibration curve is 1

0.1: Amount of enzyme solution (mL)

60: Reaction time (minute)

N: Dilution factor

[Materials Used]

Materials shown in the following table were used.

TABLE 2

| Type | Trade name | Manufacturer |
|---|---|---|
| Pea protein material | Pea Protein 870 MV (Protein content: 80 wt %) | PURIS |
| Fava bean protein material | Fava Bean Protein Powder (Protein content: 85.7 wt %) | GREEN BOY |
| Chickpea protein material | Chickpea Protein Powder (Protein content: 71.4 wt %) | GREEN BOY |
| Lentil protein material | Green Lentil Protein Powder (Protein content: 78.6 wt %) | GREEN BOY |
| Tapioca starch | Tapioca Starch | EARTHBORN ELEMENT |
| Canola oil | Canola oil | NATIVE HARVEST |
| Coconut oil | COCONUT OIL | Nutiva |
| Nutritional yeast | Nutritional Yeast Powder | Z Natural Foods |
| κ-Carrageenan | Kappa Carrageenan | CAPE CRYSTAL BRANDS |
| Salt | Ionized salt | MORTON |

Test Example 1

(1) Production of Stretchable Cheese Alternative

Pure water (RO water) was put into a Thermomix mixer, and while stirring at 50° C. and speed 3, a pea protein material, tapioca starch, canola oil, coconut oil, salt, and an enzyme preparation shown in Table 3 were added in the amounts shown in Table 3. The mixture was stirred at 50° C. for 15 minutes and at speed 3, then the temperature was raised to 85° C., and the mixture was stirred at speed 3 for 7 minutes. Then, 100 g of the mixture was filled in each of 3 aluminum containers (bottom inner diameter: 5 cm in diameter), and the aluminum container was covered, cooled to 4° C., and stored. This provided cheese alternatives (three for each example/comparative example).

(2) Evaluation of Stretchability

Each cheese alternative in a state of being filled in the aluminum container was used as a sample, and the sample was heated for 30 minutes using a steam oven set at 110° C. (in order to eliminate the influence of moisture evaporation during heating). Thereafter, the sample was taken out from the steam oven, and after confirming that the internal temperature of the sample reached 70° C., the sample was stirred with a fork. It was confirmed that the fork was covered with the sample, the tip of the fork was lifted at 5 cm/sec so as to scoop up the sample with the fork, and the distance (stretch length (mm)) between the lifting start point of the tip of the fork and the point where the stretch of the sample was broken was measured. The stretch length was derived as an average value obtained by testing the three prepared samples in the same manner for each example/comparative example. Furthermore, the percentage of the stretch length in each example in the case where the stretch length of the comparative example not using an enzyme preparation was set to 100% was derived as a stretchability improvement evaluation index. When the stretchability improvement evaluation index is more than 100%, the sample is rated as being imparted with improved stretchability. In addition, the larger the stretchability improvement evaluation index is, the higher the effect of improving stretchability is rated. The results are shown in Table 3.

TABLE 3

| | Comparative Example 1 | Example 1 | Example 2 |
|---|---|---|---|
| Pea protein material | 6.25 | 6.25 | 6.25 |
| Protein contained in this material | 5 | 5 | 5 |

TABLE 3-continued

| | | Comparative Example 1 | Example 1 | Example 2 |
|---|---|---|---|---|
| Tapioca starch | | 14 | 14 | 14 |
| | <Parts by weight of starch per 1 part by weight of protein> | <2.8> | <2.8> | <2.8> |
| Enzyme preparation | Thermoase GL30 [Protease activity per 1 g of protein (U)] | — | [86.4] | — |
| | Protin SD-AY10 [Protease activity per 1 g of protein (U)] | — | — | [86.4] |
| Canola oil | | 4 | 4 | 4 |
| Coconut oil | | 12 | 12 | 12 |
| Salt | | 0.4 | 0.4 | 0.4 |
| Pure water | | 63.4 | 63.4 | 63.4 |
| Total | | 100 | 100 | 100 |
| Stretch length (unit: mm) | | 62 | 80 | 68 |
| Stretchability improvement evaluation index | | | 129% | 110% |

In the table, the unit of numerical values without brackets among numerical values representing blending amounts of the respective components is wt %.

As is apparent from Table 3, the stretchability was improved in the cheese alternatives produced using proteases (Examples 1 and 2) as compared with the stretchability of the cheese alternative produced without using a protease (Comparative Example 1). Among them, for the cheese alternative (Example 1) produced using a protease derived from *Geobacillus stearothermophilus* (Thermoase GL30), a better stretchability improving effect was observed.

Test Example 2

Cheese alternatives were prepared in the same manner as in Test Example 1 except that pure water (RO water), the pea protein material, the tapioca starch, the canola oil, the coconut oil, salt, and the enzyme preparations shown in Tables 4 to 6 were added in the amounts shown in Tables 4 to 6, and the stretchability was evaluated. The results are shown in Tables 4 to 6. In Table 4, the results of Comparative Example 1 and Example 1 of Test Example 1 are transcribed.

TABLE 4

| | | Comparative Example 1 | Example 1 | Example 3 | Example 4 | Example 5 | Comparative Example 2 | Comparative Example 3 |
|---|---|---|---|---|---|---|---|---|
| Pea protein material | | 6.25 | 6.25 | 6.25 | 6.25 | 6.25 | 6.25 | 6.25 |
| | Protein contained in this material | 5 | 5 | 5 | 5 | 5 | 5 | 5 |
| Tapioca starch | | 14 | 14 | 14 | 14 | 14 | 14 | 14 |
| | <Amount of starch per 1 part by weight of protein (unit: part by weight)> | <2.8> | <2.8> | <2.8> | <2.8> | <2.8> | <2.8> | <2.8> |
| Enzyme preparation | Thermoase GL30 [A] = [protease activity per 1 g of protein (unit: U)] | — | [86.4] | [86.4] | [86.4] | [86.4] | [86.4] | [86.4] |
| | Kleistase E5CC [B] = [starch dextrinizing activity per 1 g of starch (unit: U)] | — | — | [0.00141] | [0.00283] | [0.00431] | [0.00707] | [0.0141] |
| | {[B] with respect to [A] of 100,000 U (unit: U)} | — | — | {1.63} | {3.28} | {4.99} | {8.18} | {16.3} |

TABLE 4-continued

|  | Comparative Example 1 | Example 1 | Example 3 | Example 4 | Example 5 | Comparative Example 2 | Comparative Example 3 |
|---|---|---|---|---|---|---|---|
| Canola oil | 4 | 4 | 4 | 4 | 4 | 4 | 4 |
| Coconut oil | 12 | 12 | 12 | 12 | 12 | 12 | 12 |
| Salt | 0.4 | 0.4 | 0.4 | 0.4 | 0.4 | 0.4 | 0.4 |
| Pure water | 63.4 | 63.4 | 63.4 | 63.4 | 63.4 | 63.4 | 63.4 |
| Total | 100 | 100 | 100 | 100 | 100 | 100 | 100 |
| Stretch length (unit: mm) | 62 | 80 | 82 | 68 | 65 | 52 | 48 |
| Stretchability improvement evaluation index |  | 129% | 132% | 110% | 105% | 84% | 77% |

In the table, the unit of numerical values without brackets among numerical values representing blending amounts of the respective components is wt %.

TABLE 5

|  |  | Comparative Example 4 | Example 6 | Example 7 | Example 8 | Example 9 | Comparative Example 5 |
|---|---|---|---|---|---|---|---|
| Pea protein material |  | 12.5 | 12.5 | 12.5 | 12.5 | 12.5 | 12.5 |
|  | Protein contained in this material | 10 | 10 | 10 | 10 | 10 | 10 |
| Tapioca starch |  | 8.4 | 8.4 | 8.4 | 8.4 | 8.4 | 8.4 |
|  | <Amount of starch per 1 part by weight of protein (unit: part by weight)> | <0.84> | <0.84> | <0.84> | <0.84> | <0.84> | <0.84> |
| Enzyme preparation | Thermoase GL30 [A] = [protease activity per 1 g of protein (unit: U)] | — | [86.4] | [86.4] | [86.4] | [86.4] | [86.4] |
|  | Kleistase E5CC [B] = [starch dextrinizing activity per 1 g of starch (unit: U)] |  |  | [0.00139] | [0.00279] | [0.00557] | [0.00707] |
|  | {[B] with respect to [A] of 100,000 U (unit: U)} | — | — | {1.61} | {3.23} | {6.45} | {8.18} |
| Canola oil |  | 3.2 | 3.2 | 3.2 | 3.2 | 3.2 | 3.2 |
| Coconut oil |  | 9.4 | 9.4 | 9.4 | 9.4 | 9.4 | 9.4 |
| Salt |  | 0.4 | 0.4 | 0.4 | 0.4 | 0.4 | 0.4 |
| Pure water |  | 66.2 | 66.2 | 66.2 | 66.2 | 66.2 | 66.2 |
| Total |  | 100 | 100 | 100 | 100 | 100 | 100 |
| Stretch length (unit: mm) |  | 65 | 80 | 80 | 80 | 70 | 55 |
| Stretchability improvement evaluation index |  |  | 123% | 123% | 123% | 108% | 85% |

In the table, the unit of numerical values without brackets among numerical values representing blending amounts of the respective components is wt %.

TABLE 6

|  |  | Comparative Example 6 | Reference Example 1 | Reference Example 2 | Reference Example 3 | Reference Example 4 | Reference Example 5 |
|---|---|---|---|---|---|---|---|
| Pea protein material |  | 18.75 | 18.75 | 18.75 | 18.75 | 18.75 | 18.75 |
|  | Protein contained in this material | 15 | 15 | 15 | 15 | 15 | 15 |
| Tapioca starch |  | 8.4 | 8.4 | 8.4 | 8.4 | 8.4 | 8.4 |
|  | <Amount of starch per 1 part by weight of protein (unit: part by weight)> | <0.56> | <0.56> | <0.56> | <0.56> | <0.56> | <0.56> |
| Enzyme preparation | Thermoase GL30 [A] = [protease activity per 1 g of protein (unit: U)] | — | [86.4] | [86.4] | [86.4] | [86.4] | [86.4] |
|  | Kleistase E5CC [B] = [starch dextrinizing activity per 1 g of starch (unit: U)] | — | — | [0.0036] | [0.0071] | [0.0142] | [0.0283] |
|  | {[B] with respect to [A] of 100,000 U (unit: U)} | — | — | {4.17} | {8.22} | {16.44} | {32.75} |
| Canola oil |  | 3.2 | 3.2 | 3.2 | 3.2 | 3.2 | 3.2 |
| Coconut oil |  | 9.4 | 9.4 | 9.4 | 9.4 | 9.4 | 9.4 |
| Salt |  | 0.4 | 0.4 | 0.4 | 0.4 | 0.4 | 0.4 |
| Pure water |  | 59.8 | 59.8 | 59.8 | 59.8 | 59.8 | 59.8 |
| Total |  | 100 | 100 | 100 | 100 | 100 | 100 |

TABLE 6-continued

| | Comparative Example 6 | Reference Example 1 | Reference Example 2 | Reference Example 3 | Reference Example 4 | Reference Example 5 |
|---|---|---|---|---|---|---|
| Stretch length (unit: mm) | 15 | 82 | 68 | 60 | 57 | 60 |
| Stretchability improvement evaluation index | | 547% | 453% | 400% | 380% | 400% |

In the table, the unit of numerical values without brackets among numerical values representing blending amounts of the respective components is wt %.

As is apparent from Tables 4 to 6, the stretchability was improved in the cheese alternatives produced using proteases (Examples 1 and 6 and Reference Example 1) as compared with the stretchability of the cheese alternatives produced without using a protease (Comparative Examples 1, 4, and 6).

In addition, in the case of the cheese alternatives produced using an enzyme preparation in which an amylase was added to a protease (Examples 3 to 5, Comparative Examples 2 and 3, Examples 7 to 9, Comparative Example 5, and Reference Examples 2 to 5), when the blending amount of starch was 0.6 parts by weight or more per 1 part by weight of a plant protein (Examples 3 to 5, Comparative Examples 2 and 3, Examples 7 to 9, and Comparative Example 5), the stretchability was improved only when the enzyme preparation had a starch dextrinizing activity (the value of [B] in the tables) per 1 g of starch of 8 U or less with respect to a protease activity of 100,000 U (the values of [A] in the tables) per 1 g of the plant protein. On the other hand, when the blending amount of the starch was less than 0.6 parts by weight per 1 part by weight of the plant protein (Reference Examples 2 to 5), the value of [B] with respect to a value of [A] of 100,000 U was not limited as seen in Examples 3 to 5 and 7 to 9, and the stretchability was improved regardless of the value of [B] with respect to a value of [A] of 100,000 U.

The mechanism of the specific limitation on the value of [B] with respect to a value of [A] of 100,000 U accompanying only the case where the material composition has a specific composition in which the blending amount of starch is 0.6 parts by weight or more per 1 part by weight of a plant protein (Examples 3 to 5, Comparative Examples 2 and 3, Examples 7 to 9, and Comparative Example 5) is not clear but is considered as follows. Generally, proteins have a property of absorbing water, and in a material composition not having the specific composition (a material composition in which the blending amount of starch is less than 0.6 parts by weight per 1 part by weight of plant protein, as used in Reference Examples 2 to 5. Hereinafter, it is referred to as a "material composition (1)"), the amount of water that can be absorbed by the protein is large with respect to the amount of starch because the relative amount of plant protein with respect to the amount of starch is large, whereas in a material composition having the specific composition (a material composition in which the blending amount of starch is 0.6 parts by weight or more per 1 part by weight of plant protein as used in Examples 3 to 5, Comparative Examples 2 and 3, Examples 7 to 9, and Comparative Example 5. Hereinafter, it is referred to as a "material composition (2)"), the amount of water that can be absorbed by the protein is small with respect to the amount of starch because the relative amount of the plant protein with respect to the amount of starch is small. In the case of the material composition (1) in which the relative amount of protein is large, even when a situation occurs in which starch is decomposed by excessive starch dextrinizing activity (starch dextrinizing activity with a value of [B] of more than 8 U with respect to a value of [A] of 100,000 U) and the viscosity decreases, the protein sufficiently absorbs water to prevent a significant decrease in viscosity, and the effect of improving stretchability is not completely lost because the influence of the starch dextrinizing activity is masked (Reference Examples 3 to 5). On the other hand, in the case of the material composition (2) in which the relative amount of protein was small, when a situation occurred in which starch was decomposed by excessive starch dextrinizing activity (starch dextrinizing activity with a value of [B] of more than 8 U with respect to a value of [A] of 100,000 U) and the viscosity decreased, the protein was not able to sufficiently absorb water, and the effect of improving stretchability was considered to be completely lost because the influence of the starch dextrinizing activity appeared (Comparative Examples 2, 3, and 5).

Test Example 3

Cheese alternatives were prepared in the same manner as in Test Example 1 except that pure water (RO water), the pea protein material, the tapioca starch, the canola oil, the coconut oil, nutritional yeast, κ-carrageenan, salt, and the enzyme preparations shown in Table 7 were added in the amounts shown in Table 7.

(1) Evaluation of Stretchability

The stretchability was evaluated in the same manner as in Test Example 1. A relative value of the stretch length in each example in the case where the stretch length of the comparative example not using an enzyme preparation was set to 1 was derived as a stretchability improvement evaluation index. When the stretchability improvement evaluation index is more than 1, the sample is rated as being imparted with improved stretchability. In addition, the larger the stretchability improvement evaluation index is, the higher the effect of improving stretchability is rated. The results are shown in Table 7.

(2) Evaluation of Thermal Meltability

The prepared cheese alternative was used to evaluate the thermal meltability. Commercially available frozen pizza dough (7 inches) was cut and applied with commercially available pizza sauce. The prepared cheese alternative was placed thereon and cooked with heat in a steam oven at 110° C. for 30 minutes. The thermal meltability of the cheese alternative after cooking with heat was evaluated according to the following criteria. The results are shown in Table 7.

−: Melting of the cheese fragments cannot be confirmed.

+: The cheese fragments melted but clearly retain their shapes.

++: The cheese fragments retain their shapes to some degree.

+++: The cheese fragments do not retain their shapes.

(3) Evaluation of Bitter Peptide Reduction (Hydrophobic Peptide Degradation, i.e., Increase of Hydrophobic Amino Acids)

Using the prepared cheese alternative, the increase of hydrophobic amino acids was examined to evaluate the bitter peptide reduction. To 1 g of the cheese alternative, 1 ml of water was added, and the mixture was homogenized in a vortex mixer. Centrifugation was performed at 13,000 rpm for 5 minutes to collect the supernatant. The collected supernatant was filtered using a syringe filter to obtain a sample for HPLC analysis. Analysis using a ninhydrin reaction in a post column reactor was performed using HPLC, and the total amount (derived as an amount converted to an amount (mg) per 1 g of the cheese alternative) of Gly, Ala, Val, Met, Ile, Leu, Phe, and Pro was measured as the amount of hydrophobic amino acids. Furthermore, a relative value with the amount of the hydrophobic amino acids in the corresponding comparative example (that is, an example of preparation under the same conditions except that treatment with an enzyme preparation was not performed) being 1 was derived as the rate of increase in the amount of the hydrophobic amino acids. The higher the rate of increase in the amount of the hydrophobic amino acids is, the more the hydrophobic peptides exhibiting bitterness are decomposed into amino acids, that is, the further the bitterness is reduced. The results are shown in Table 7.

Analytical column: TSKgel Aminopak
Mobile phase: HITACHI AMINO ACID ANALYSIS Buffer pH1-4

TABLE 7

| | | Comparative Example 7 | Example 10 | Example 11 |
|---|---|---|---|---|
| Type of raw material | | | Pea | |
| Protein material | | 12.5 | 12.5 | 12.5 |
| | Protein contained in this material | 10 | 10 | 10 |
| Tapioca starch | | 8.4 | 8.4 | 8.4 |
| | <Amount of starch per 1 part by weight of protein (unit: part by weight)> | <0.84> | <0.84> | <0.84> |
| Enzyme preparation | Thermoase PC10FNA [Protease activity per 1 g of protein (unit: U)] | — | [81] | [81] |
| | Peptidase R [Peptidase activity per 1 g of protein (unit: U)] | — | — | [0.21] |
| Canola oil | | 8 | 8 | 8 |
| Coconut oil | | 2.6 | 2.6 | 2.6 |
| Nutritional yeast | | 2 | 2 | 2 |
| κ-Carrageenan | | 1 | 1 | 1 |
| Salt | | 0.4 | 0.4 | 0.4 |
| Pure water | | 65.2 | 65.0 | 65.0 |
| Total | | 100 | 100 | 100 |
| Stretch length (unit: mm) | | 45.0 | 70.0 | 75.0 |
| Stretchability improvement evaluation index | | | 1.56 | 1.67 |
| Thermal meltability | | + | ++ | +++ |
| Rate of increase in amount of hydrophobic amino acids | | | 1.08 | 1.49 |

In the table, the unit of numerical values without brackets among numerical values representing blending amounts of the respective components is wt %.

As is apparent from Table 7, the stretchability was improved in the cheese alternatives produced using a protease (Examples 10 and 11) as compared with the stretchability of the cheese alternative produced without using the protease (Comparative Example 7), and in particular, by using a peptidase in combination with the protease, a better stretchability improving effect was observed (Example 11). As for the thermal meltability, the thermal meltability was improved in the cheese alternatives produced using the protease (Examples 10 and 11) as compared with the cheese alternative produced without using the protease (Comparative Example 7), and in particular, by using the peptidase in combination with the protease, better thermal meltability was observed (Example 11). As for the amount of the hydrophobic amino acids, the amount of the hydrophobic amino acids was improved in the cheese alternatives produced using the protease (Examples 10 and 11) as compared with the amount of the hydrophobic amino acids in the cheese alternative produced without using the protease (Comparative Example 7), and in particular, by using the peptidase in combination with the protease, a better effect of increasing the amount of the hydrophobic amino acids was observed (Example 11). In fact, when sensory tests were conducted on Comparative Example 7, Example 10, and Example 11, it was confirmed that while a bitter taste was felt for the cheese alternative of Comparative Example 7, the bitter taste was suppressed for the cheese alternative of Example 10, and such a good taste that the bitter taste disappeared was obtained for the cheese alternative of Example 11.

Test Example 4

Cheese alternatives were prepared in the same manner as in Test Example 1 except that pure water (RO water), a fava bean protein material, the tapioca starch, the coconut oil, κ-carrageenan, salt, and the enzyme preparations shown in Table 8 were added in the amounts shown in Table 8.

(1) Evaluation of Stretchability

The stretchability was evaluated in the same manner as in Test Example 1. A relative value of the stretch length in each example in the case where the stretch length of the comparative example not using an enzyme preparation was set to 1 was derived as a stretchability improvement evaluation index. When the stretchability improvement evaluation index is more than 1, the sample is rated as being imparted with improved stretchability. In addition, the larger the stretchability improvement evaluation index is, the higher the effect of improving stretchability is rated. The results are shown in Table 8.

(2) Evaluation of Bitter Peptide Reduction (Hydrophobic Peptide Degradation, i.e., Increase of Hydrophobic Amino Acids)

The increase of hydrophobic amino acids was examined to evaluate the bitter peptide reduction in the same manner as in Test Example 3. The results are shown in Table 8.

TABLE 8

| | | Comparative Example 8 | Example 12 | Example 13 |
|---|---|---|---|---|
| Type of raw material | | | Fava bean | |
| Protein material | | 11.6 | 11.6 | 11.6 |
| | Protein contained in this material | 10 | 10 | 10 |
| Tapioca starch | | 8 | 8 | 8 |
| | <Amount of starch per 1 part by weight of protein (unit: part by weight)> | <0.80> | <0.80> | <0.80> |

TABLE 8-continued

| | | Compara-tive Exam-ple 8 | Exam-ple 12 | Exam-ple 13 |
|---|---|---|---|---|
| Enzyme prepara-tion | Thermoase PC10FNA [Protease activity per 1 g of protein (unit: U)] | — | [90] | [90] |
| | Peptidase R [Peptidase activity per 1 g of protein (unit: U)] | — | — | [0.042] |
| Canola oil | | — | — | — |
| Coconut oil | | 15 | 15 | 15 |
| Nutritional yeast | | — | — | — |
| κ-Carrageenan | | 1 | 1 | 1 |
| Salt | | 0.4 | 0.4 | 0.4 |
| Pure water | | 64.0 | 64.0 | 64.0 |
| Total | | 100 | 100 | 100 |
| Stretch length (unit: mm) | | 62.5 | 67.5 | 77.5 |
| Stretchability improvement evaluation index | | | 1.08 | 1.24 |
| Rate of increase in amount of hydrophobic amino acids | | | 1.34 | 1.83 |

In the table, the unit of numerical values without brackets among numerical values representing blending amounts of the respective components is wt %.

As is apparent from Table 8, the stretchability was improved in the cheese alternatives produced using a protease (Examples 12 and 13) as compared with the stretchability of the cheese alternative produced without using the protease (Comparative Example 8), and in particular, by using a peptidase in combination with the protease, a better stretchability improving effect was observed (Example 13). As for the amount of the hydrophobic amino acids, the amount of the hydrophobic amino acids was improved in the cheese alternatives produced using the protease (Examples 12 and 13) as compared with the amount of the hydrophobic amino acids in the cheese alternative produced without using the protease (Comparative Example 8), and in particular, by using the peptidase in combination with the protease, a better effect of increasing the amount of the hydrophobic amino acids was observed (Example 13), which suggested that the hydrophobic peptides causing a bitter taste were reduced.

Test Example 5

Cheese alternatives were prepared in the same manner as in Test Example 1 except that pure water (RO water), a chickpea protein material, the tapioca starch, the coconut oil, κ-carrageenan, salt, and the enzyme preparations shown in Table 9 were added in the amounts shown in Table 9.

(1) Evaluation of Stretchability

The stretchability was evaluated in the same manner as in Test Example 1. A relative value of the stretch length in each example in the case where the stretch length of the comparative example not using an enzyme preparation was set to 1 was derived as a stretchability improvement evaluation index. When the stretchability improvement evaluation index is more than 1, the sample is rated as being imparted with improved stretchability. In addition, the larger the stretchability improvement evaluation index is, the higher the effect of improving stretchability is rated. The results are shown in Table 9.

(2) Evaluation of Bitter Peptide Reduction (Hydrophobic Peptide Degradation, i.e., Increase of Hydrophobic Amino Acids)

The increase of hydrophobic amino acids was examined to evaluate the bitter peptide reduction in the same manner as in Test Example 3. The results are shown in Table 9.

TABLE 9

| | | Compara-tive Exam-ple 9 | Exam-ple 14 | Exam-ple 15 |
|---|---|---|---|---|
| Type of raw material | | | Chickpea | |
| Protein material | | 14.0 | 14.0 | 14.0 |
| | Protein contained in this material | 10 | 10 | 10 |
| Tapioca starch | | 8 | 8 | 8 |
| | <Amount of starch per 1 part by weight of protein (unit: part by weight)> | <0.80> | <0.80> | <0.80> |
| Enzyme prepara-tion | Thermoase PC10FNA [Protease activity per 1 g of protein (unit: U)] | — | [90] | [90] |
| | Peptidase R [Peptidase activity per 1 g of protein (unit: U)] | — | — | [0.042] |
| Canola oil | | — | — | — |
| Coconut oil | | 15 | 15 | 15 |
| Nutritional yeast | | — | — | — |
| κ-Carrageenan | | 1 | 1 | 1 |
| Salt | | 0.4 | 0.4 | 0.4 |
| Pure water | | 61.6 | 61.6 | 61.6 |
| Total | | 100 | 100 | 100 |
| Stretch length (unit: mm) | | 57.5 | 70.0 | 75.0 |
| Stretchability improvement evaluation index | | | 1.22 | 1.30 |
| Rate of increase in amount of hydrophobic amino acids | | | 1.03 | 1.92 |

In the table, the unit of numerical values without brackets among numerical values representing blending amounts of the respective components is wt %.

As is apparent from Table 9, the stretchability was improved in the cheese alternatives produced using a protease (Examples 14 and 15) as compared with the stretchability of the cheese alternative produced without using the protease (Comparative Example 9), and in particular, by using a peptidase in combination with the protease, a better stretchability improving effect was observed (Example 15). As for the amount of the hydrophobic amino acids, the amount of the hydrophobic amino acids was improved in the cheese alternatives produced using the protease (Examples 14 and 15) as compared with the amount of the hydrophobic amino acids in the cheese alternative produced without using the protease (Comparative Example 9), and in particular, by using the peptidase in combination with the protease, a better effect of increasing the amount of the hydrophobic amino acids was observed (Example 15), which suggested that the hydrophobic peptides causing a bitter taste were reduced.

Test Example 6

Cheese alternatives were prepared in the same manner as in Test Example 1 except that pure water (RO water), a lentil protein material, the tapioca starch, the coconut oil, κ-carrageenan, salt, and the enzyme preparations shown in Table 10 were added in the amounts shown in Table 10.

(1) Evaluation of Stretchability

The stretchability was evaluated in the same manner as in Test Example 1. A relative value of the stretch length in each example in the case where the stretch length of the comparative example not using an enzyme preparation was set to 1 was derived as a stretchability improvement evaluation index. When the stretchability improvement evaluation index is more than 1, the sample is rated as being imparted with improved stretchability. In addition, the larger the stretchability improvement evaluation index is, the higher the effect of improving stretchability is rated. The results are shown in Table 10.

(2) Evaluation of Thermal Meltability

The thermal meltability was evaluated in the same manner as in Test Example 3. The results are shown in Table 10.

(3) Evaluation of Bitter Peptide Reduction (Hydrophobic Peptide Degradation, i.e., Increase of Hydrophobic Amino Acids)

The increase of hydrophobic amino acids was examined to evaluate the bitter peptide reduction in the same manner as in Test Example 3. The results are shown in Table 10.

TABLE 10

| | | Compara-tive Exam-ple 10 | Exam-ple 16 | Exam-ple 17 |
|---|---|---|---|---|
| Type of raw material | | | Lentil | |
| Protein material | | 12.7 | 12.7 | 12.7 |
| | Protein contained in this material | 10 | 10 | 10 |
| Tapioca starch | | 8 | 8 | 8 |
| | <Amount of starch per 1 part by weight of protein (unit: part by weight)> | <0.80> | <0.80> | <0.80> |
| Enzyme prepara-tion | Thermoase PC10FNA [Protease activity per 1 g of protein (unit: U)] | — | [90] | [90] |
| | Peptidase R [Peptidase activity per 1 g of protein (unit: U)] | — | — | [0.042] |
| Canola oil | | — | — | — |
| Coconut oil | | 15 | 15 | 15 |
| Nutritional yeast | | — | — | — |
| κ-Carrageenan | | 1 | 1 | 1 |
| Salt | | 0.4 | 0.4 | 0.4 |
| Pure water | | 62.9 | 62.9 | 62.9 |
| Total | | 100 | 100 | 100 |
| Stretch length (unit: mm) | | 60 | 72.5 | 82.5 |
| Stretchability improvement evaluation index | | | 1.21 | 1.38 |
| Thermal meltability | | ++ | +++ | +++ |
| Rate of increase in amount of hydrophobic amino acids | | | 1.08 | 1.59 |

In the table, the unit of numerical values without brackets among numerical values representing blending amounts of the respective components is wt %.

As is apparent from Table 10, the stretchability was improved in the cheese alternatives produced using a protease (Examples 16 and 17) as compared with the stretchability of the cheese alternative produced without using the protease (Comparative Example 10), and in particular, by using a peptidase in combination with the protease, a better stretchability improving effect was observed (Example 17). As for the thermal meltability, excellent thermal meltability was observed in the cheese alternative produced using the protease (Examples 16) and the cheese alternative produced using the peptidase in combination with the protease (Example 17) as compared with the cheese alternative produced without using the protease (Comparative Example 10). As for the amount of the hydrophobic amino acids, the amount of the hydrophobic amino acids was improved in the cheese alternatives produced using the protease (Examples 16 and 17) as compared with the amount of the hydrophobic amino acids in the cheese alternative produced without using the protease (Comparative Example 10), and in particular, by using the peptidase in combination with the protease, a better effect of increasing the amount of the hydrophobic amino acids was observed (Example 17), which suggested that the hydrophobic peptides causing a bitter taste were reduced.

The invention claimed is:

1. A method for producing a stretchable cheese alternative, comprising a step of treating a material composition containing a plant protein and 0.6 parts by weight or more of starch per 1 part by weight of the plant protein with an enzyme preparation containing a protease and an amylase, wherein the enzyme preparation is used so that starch dextrinizing activity of the amylase per 1 g of the starch is 8 U or less with respect to a protease activity of 100,000 U of the protease per 1 g of the plant protein.

2. The production method according to claim 1, wherein the enzyme preparation contains the amylase, and the starch dextrinizing activity per 1 g of the starch is 0.5 U or more with respect to the protease activity of 100,000 U per 1 g of the plant protein.

3. The production method according to claim 1, wherein the protease is a bacteria-derived protease.

4. The production method according to claim 1, wherein the protease is a protease derived from the genus *Bacillus* and/or the genus *Geobacillus*.

5. The production method according to claim 1, wherein the protease is selected from the group consisting of proteases derived from *Bacillus stearothermophilus*, *Bacillus licheniformis*, and these species in the genus *Geobacillus*.

6. The production method according to claim 1, wherein the enzyme preparation is used such that the protease activity per 1 g of the plant protein is 10 to 500 U.

7. The production method according to claim 1, further comprising a step of treating with a peptidase.

8. The production method according to claim 1, wherein the plant protein is a pea protein, a fava bean protein, a chickpea protein, and/or a lentil protein.

9. The production method according to claim 1, wherein a content of the plant protein in the material composition is 1 wt % or more and less than 15 wt %.

10. The production method according to claim 1, wherein the starch is tapioca starch.

11. The production method according to claim 1, wherein a content of the starch per 1 part by weight of the plant protein is 5 parts by weight or less.

12. A stretchability improver for a stretchable cheese alternative containing a plant protein and 0.6 parts by weight or more of starch per 1 part by weight of the plant protein, comprising an enzyme preparation containing a protease and an amylase, the stretchability improver used so that starch dextrinizing activity of the amylase per 1 g of the starch is 8 U or less with respect to a protease activity of 100,000 U of the protease per 1 g of the plant protein.

13. The stretchability improver according to claim 12, further comprising a peptidase.

* * * * *